United States Patent
Moran

(10) Patent No.: US 6,840,127 B2
(45) Date of Patent: Jan. 11, 2005

(54) TENDON LINK MECHANISM WITH SIX DEGREES OF FREEDOM

(76) Inventor: Michael Julius Moran, 206 Mount Pleasant Rd., New Bern, NC (US) 28560

( * ) Notice: Subject to any disclaimer, the term of this patent is extended or adjusted under 35 U.S.C. 154(b) by 196 days.

(21) Appl. No.: 10/358,547

(22) Filed: Feb. 5, 2003

(65) Prior Publication Data

US 2004/0149065 A1 Aug. 5, 2004

(51) Int. Cl.[7] .................................... B25J 17/00
(52) U.S. Cl. ........................ 74/490.04; 74/490.05; 414/735; 901/21
(58) Field of Search ............ 74/490.01, 490.04, 74/490.05; 414/735; 901/9, 15, 16, 21

(56) References Cited

U.S. PATENT DOCUMENTS

| | | | | |
|---|---|---|---|---|
| 5,507,596 A | * | 4/1996 | Bostelman et al. ......... 405/191 |
| 5,715,729 A | * | 2/1998 | Toyama et al. ........... 74/490.03 |
| 5,847,528 A | * | 12/1998 | Hui et al. ................ 318/568.1 |
| 6,371,952 B1 | * | 4/2002 | Madhani et al. ............... 606/1 |
| 6,516,681 B1 | * | 2/2003 | Pierrot et al. ........... 74/490.01 |
| 6,543,987 B2 | * | 4/2003 | Ehrat ......................... 414/735 |
| 6,648,583 B1 | * | 11/2003 | Roy et al. ................... 414/735 |
| 2001/0020199 A1 | * | 9/2001 | Bacchi et al. ............... 700/245 |
| 2003/0221504 A1 | * | 12/2003 | Stoianovici et al. ..... 74/490.04 |
| 2004/0149065 A1 | * | 8/2004 | Moran .................... 74/490.04 |

* cited by examiner

Primary Examiner—David M. Fenstermacher

(57) ABSTRACT

A computer-controlled parallel-leg mechanism, with three pairs of remotely-actuated tendon legs, provides accurate six-degrees-of-freedom motion and positioning for a tool platform. Leg pair termination at a common point with three degrees of pivoting freedom is provided by a unique linkage joint. Non-intrusive tool-position feedback is enabled by nine shaft encoders mounted at the mechanism's base end.

10 Claims, 8 Drawing Sheets

TENDON LINK MECHANISM WITH SIX DEGREES OF FREEDOM

CROSS-REFERENCE TO RELATED APPLICATIONS

Not Applicable.

BACKGROUND OF THE INVENTION

This invention is directed to automated mechanisms for generating precise six-degrees-of-freedom position-and-motion profiles for tool tips, end effectors, work pieces, and the like.

DESCRIPTION OF PRIOR ART

The scope of this invention includes applications as diverse as medical procedures, manufacturing assembly, parts machining, and motion simulators. Historically, most flexible-automation mechanisms have been based on serial linkages, which may be considered analogous to the human arm with its links (bones) and joints. Such an arrangement of links and joints makes it possible for the hand to be moved and positioned with six degrees of freedom with respect to the shoulder. The hand is analogous to the mechanism's end effector (the element of the linkage that interfaces with its environment, e.g. a mechanical hand).

However, such serial linkages, cantilevering from the first joint as they do, lack desirable stiffness. Thus, repeatability, accuracy, and deflection from the end effector's desired position, are difficult design considerations. As stiffness is increased, size and mass are necessarily increased, and operational speed and cost are adversely affected.

Kinematics is the analysis of the positions and motions of the links of a mechanism, without a consideration of the forces involved. The analysis, when beginning with the fixed base (shoulder) and proceeding to the controlled element (hand), is called forward kinematics. When the analysis begins with the controlled element, and works back to the fixed element, the analysis is called inverse kinematics.

The forward kinematical analysis of most serial linkages is straight forward; given the lengths of the links, and the angles of the joints, it is easy to determine end-effector position. The inverse kinematics are more difficult to solve. Given the desired end-effector position, it can be very difficult to determine the optimum joint angles to obtain it. Sometimes there are infinite solutions to choose from.

Parallel-link mechanisms have been developed, which provide for greater stiffness, less moving mass, higher end-effector speed, and easier inverse-kinematical calculations, when compared with serial linkages. The word "parallel" in this context refers to two or more independent linkage paths between two surfaces or platforms; the linkage paths are not actually geometrically parallel. With such mechanisms the improved accuracy is inherent in the geometry; errors are not multiplied from joint to joint, as they are with serial linkages. When made with six parallel links, or legs, the mechanisms are often referred to as Gough platforms, Stewart platforms, parallel robots, and hexapods in the literature.

Inverse-kinematical solutions, which are difficult for serial linkages, are relatively easy for some parallel linkages. This makes open-loop real-time computer control of the mechanisms practical. If a desired end-effector position is known, a computer can calculate the necessary length of each leg and control the leg's associated actuator to achieve the proper length. When each leg is of the proper length, the end effector is in the correct position.

Forward-kinematical calculations for parallel linkages range from difficult to nearly impossible, for many of the common geometries. This is not a significant problem when the movement control is open loop, since the open loop calculations can be based upon the much easier inverse kinematics. However, the lack of a forward-kinematical solution means that it is more difficult to obtain confirmation that the controlled point is really where the computer calculates it to be. As a result, position feedback often requires complicated techniques and instruments.

U.S. Pat. No. 3,288,421 to Peterson (1966) discloses such a six-legged parallel mechanism for moving a platform, with six degrees of freedom. One end of each of the legs is attached, with pivoting freedom, to the movable platform, and each leg's other end is attached, with pivoting freedom, to a fixed base. The pivoting freedom is provided by a hemisphere attached to each end of each leg. The hemispheres of one end of each of two legs are placed together in a socket to provide a ball and socket joint. All leg ends are thus joined. The legs are disclosed to be hydraulic cylinders, and thus are capable of variable lengths. As one or more of the legs change length, the platform moves while maintaining a rigid relationship with the base.

U.S. Pat. No. 3,295,224 to Cappel (1967)—later reissued as Re. 27,051 (1971)—discloses what is essentially the same parallel mechanism used as a motion simulator, capable of generating motion with six degrees of freedom. Specifically mentioned is motion that simulates helicopter flight and also space-flight maneuvers. Controlled motion is obtained by controlling the lengths of six variable-length legs, which are disclosed to be hydraulic cylinders. The ends of the legs are given pivoting freedom by common universal joints.

U.S. Pat. No. 5,354,158 to Sheldon, et al. (1994) discloses what is essentially the same parallel mechanism used as a machine tool. Motion is controlled by six variable-length legs, which may be hydraulic cylinders or ball screws. The ends of the legs are given pivoting freedom by universal joints. Also disclosed are multiple sensing arms, which have one end connected to the base, and the other end connected to the moving platform, to provide reference distances between the tool and the work piece.

Each of the above cited mechanisms has the following common features:

(a) Each is a six-degrees-of-freedom parallel-linkage mechanism of the so-called Stewart platform type.
(b) Each has six variable-length legs connecting a base surface to a movable platform; the legs provide six degrees of freedom for the desired motion, and six degrees of constraint for any undesired motion.
(c) Each has one end of each leg connected, with pivoting freedom, to a precisely-known, fixed point on the movable platform.
(d) Each has the other end of each leg connected, with pivoting freedom, to a precisely-known, fixed point on a base member.
(e) Each has actuators (e.g. hydraulic cylinders, or ball screws) serving as some, or all, of the legs.

The advantages of this disclosed art, over the more common serial linkage art include:

(a) a much greater stiffness; thereby reducing deflection error.
(b) less moving mass (and thus less troublesome momentum), resulting in cost, speed, and power benefits.

(c) no serial linking of actuators; thereby simplifying power and signal routing.

(d) a much more easily obtained inverse-kinematical solution; thereby facilitating practical real-time computer control of the mechanism.

(e) greater load bearing capacity for a given size; the load is shared by six legs with stiff six degrees of constraint for unwanted motion.

(f) greater operational speed of the controlled point.

The above disclosed art, while valuable and workable, has the following disadvantages and limitations:

(a) These parallel-link mechanisms have smaller work spaces than serial linkages of the same size. Work space is limited by so-called singularities (moving-platform positions where the leg vectors create a mathematically-indeterminate system because of linear dependencies), and by positions where two or more legs interfere with each other. It will be obvious to those skilled in the art that as the diameters of the individual legs increase, the leg-conflict space increases, thereby reducing the available work space.

By using actuators (e.g. hydraulic cylinders, or ball screws) as legs, or links, the necessary leg diameters must increase as the size of the mechanism increases. Each leg will serve at times as a tensile member, and at times as a compression member; thus, to avoid bucking under compression, the diameter must be sufficiently large. Additionally, each actuator must be large enough to provide the necessary working forces.

It will be appreciated that an "ideal leg" would be a force vector—with zero thickness—capable of precisely-controllable extension and retraction, and free from the danger of column buckling from compression loads. Such an ideal leg would minimize the leg conflict spaces, and thereby increase the available work space. Conversely, actuators used as legs significantly reduce the available work space. If actuator size is compromised for the sake of work space, actuator-force capacity is reduced.

Actuators used as legs additionally require hydraulic hoses for cylinders, motors and power feeds for screws, etc. which can, and often do, clutter potential work space, thereby further decreasing the available work space, and undesirably increasing the moving mass.

(b) The above disclosed parallel-mechanism designs, with actuators used for the legs, are not readily scalable. For example, while a thirty-six inch hydraulic cylinder is very practical and is widely available, a thirty foot hydraulic cylinder is not practical for a six-legged-mechanism design, and is not readily available. Likewise, hydraulic cylinder legs are not practical for a parallel mechanism, with average leg lengths of a quarter inch. Ball screws and other commonly available actuators, likewise, are not practical for small and large scale designs.

(c) Each type of actuator, disclosed for use as a parallel leg, is limited in its percent extension or contraction. For example, if a hydraulic cylinder is used as a parallel-mechanism leg, its possible amount of extension will be less than the retracted cylinder's overall length. Thus, the minimum leg length will be more than half of the maximum leg length. This range of actuation is too limiting for some applications. It is obvious that any limitation of the one dimensional actuation range will result in a correspondingly greater limitation of the three-dimensional work space.

(d) As actuator legs approach their maximum extension, internal tolerances, unbalanced-force-induced bending, and compression-induced buckling can combine to reduce the effective stiffness and accuracy of the mechanism. For example, there is more side play in a hydraulic cylinder when near its maximum extension than when it is nearly fully retracted. The amount of side play will increase as the cylinder wears. Also, for example, manufacturing tolerances in ball screws can result in cumulative errors for long traverses of the "nut".

(e) Backlash is an unfortunate reality when actuators, as described above, change back and forth between compression and tension loading. Ball screws and gearing have a certain amount of backlash inherently built in due to manufacturing tolerances. Usage causes wear, and wear causes increased backlash. Hydraulic systems can manifest sponginess due to air in the operating fluid, and a form of backlash due to the hysteresis of fluid circuit components. Backlash is a form of uncertainty in a dynamic system. In the parallel mechanisms previously discussed, backlash can mean reduced system stiffness, position and motion uncertainty, and degraded repeatability.

(f) As discussed in (a) above, the usable work space is reduced by the mutual interference of legs that can occur at certain moving platform positions. Because actuators must be stiff to resist bending and buckling, such collisions of actuators can easily jam the mechanism, likely with damage to the actuators. Manual disassemble of part of the mechanism can be required to "unjam" the linkages.

(g) It is obvious that leg collisions, as discussed in (f) above, and collisions of any moving parts of the mechanism (including its end effector) with other objects are possible. If the actuators are position or motion driven, as opposed to force driven, an unexpected collision can generate high forces, limited only by the capacities of the actuators, which necessarily are considerable. The potential for high forces caused by unexpected events is a danger for personnel and equipment. A further related danger is that of a person being struck and held, or "pinned", by a moving member. The disclosed mechanisms do not provide means for quickly releasing a person so held.

(h) Of the above cited patents, only U.S. Pat. No. 5,354,158 addresses a means of obtaining feedback of the actual position of the moving platform. The means so described involve six moving "instrument arms", which are "digital positioning devices", that connect to the base and to the moving platform. The arms are based on laser interferometry, or magnetic scales. Such a feedback system would be bulky, costly, and fragile. As disclosed, the feedback system would significantly decrease the available work space described in (a) above because of arm collisions. More significantly, the instrument arms, as disclosed, would provide six lengths that would require a forward-kinematical solution. Such a solution would be difficult to obtain for real-time control, for the disclosed geometry. Prior art does not provide for an economical, robust, and non-intrusive position-feedback method or device for these parallel linkages.

(i) Using actuators as legs precludes removing the actuators to a remote location or to a different environment. For example, if the actuators were located in a zone unreachable by any moving elements of the mechanism, then maintenance and troubleshooting for the actuators could be safely performed while the mechanism is moving. Likewise, if the actuators could be located in a different environment, then the mechanism could be located in a clean room, in a vacuum, under water, etc., without danger of cross contamination between the mechanism's environment and the actuators' environment.

(j) For some parallel-mechanism geometries it is desirable for pairs of legs to terminate with pivoting freedom at exactly the same point. For example, U.S. Pat. No. 3,288,421, cited above, describes one such parallel-mechanism geometry. A ball and socket pivoting joint made with hemispheres is claimed to provide the described geometry.

Precision hemispheres and precision spherical sockets are very expensive to make and are subject to contaminant wear since bearing surfaces are operationally exposed to contamination.

Also, although effort was made to provide a pivoting joint that would give two legs the same termination point, the disclosed design actually provides termination points one hydraulic-cylinder rod's diameter apart. This amount of separation would be unacceptable for some applications due to the kinematical consequences. Additionally, the ball and socket arrangement places a restrictive total solid-angle limit because the joint must be designed to withstand tensile loads, as well as the more easily accommodated compressive loads.

Prior art has not provided an economical means of providing pivoting freedom for two leg ends terminating at the same point, without imposing restrictions on the otherwise available work space. The other two above cited patents do not disclose geometries with paired-leg ends, and thus are able to achieve adequate pivoting freedom, for leg ends, with universal joints.

In considering the inverse kinematics of the above cited mechanisms, it is convenient to work with two different right-hand orthogonal-axis coordinate systems. One of the coordinate systems is fixed in location and in orientation, with respect to the non-moving (base) parts of the mechanism, and is hereafter referred to as the "fixed system". The other is rigidly affixed to the moving platform, and is hereafter referred to as the "platform system". It will be appreciated that the base-end location of each leg can be readily determined in the fixed system, from the mechanism's known geometry and dimensions, and that the platform-end location of each leg can be readily determined in the platform system, from the mechanism's known geometry and dimensions.

Once the platform-end coordinates of each leg are determined in the fixed system, the leg vectors are defined, and the complete kinematical solution of the mechanism is trivial. For example, consider the case where the moving platform rigidly supports a tool that must be positioned relative to a fixed work piece. Since the work piece is stationary, any point on it can be readily specified in the fixed system. Thus, it is necessary to bring the tool tip to a given point in the fixed system, and with a given orientation in the three-dimensional space of the fixed system, to perform work on the work piece. This requirement thus specifies the necessary tool-tip position and orientation vectors in the fixed system. However, the tool-tip position and orientation vectors are already known in the platform system. By using vector-translation-and-rotation operators, which are familiar to those skilled in the art, it is a simple matter to define platform points with fixed system coordinates, and thus, to precisely specify fixed system coordinates for the platform-end of each leg.

Thus, the inverse-kinematical solution is readily obtainable if the base-end location of each leg is fixed and is of precisely known coordinates in the fixed system, and the platform-end location of each leg is fixed and of precisely known coordinates in the platform system. When mathematical manipulation results in both ends of each leg being specified in the fixed coordinate system, the leg vectors are essentially defined.

Conversely, by the same requirement, if either end position of any leg is unknowable, then the leg is undefined, and a controller cannot drive the mechanism to a desired point. An important issue here is that an element of a mechanism may be physically capable of being in a given position and orientation, but not be capable of being driven to that position and orientation with real-time computer control. An example is found in the following cited patent's disclosure.

A parallel-link geometry (somewhat similar in appearance to the above discussed mechanisms, but with significantly different kinematics) is disclosed by U.S. Pat. No. 4,666,362 to Landsberger, et al. (1987). The invention is described as: " . . . a manipulator for supporting and transmitting movement to a tool or the like . . . ". In an apparent attempt to solve some of the limitations associated with the use of actuators as parallel-mechanism legs, cables are used for the legs. Cable lengths are varied by winding or unwinding cables from spools that are driven by hydraulic motors, which are rigidly mounted to the base surface. The hydraulic motors are said to be controllable by controlling their respective valves by direct joystick actuation, or by pre-programmed computer control.

The following description refers to the Prior Art figure of this specification. The figure illustrates some essential geometrical considerations of each of six substantially identical legs. As a cable leaves a powered spool (not shown) it threads around a pivoting idler pulley 30 (as depicted by a cable segment 32) and then on to a point on the moving platform (not shown). The pulley is free to pivot about a pivot axis line 38 that is tangent to the bottom of the pitch circle of pulley 30 and that is also tangent to the spool (and is thus parallel to the base surface of the manipulator). Thus, the pitch circle of the pulley constantly lies in a moving plane that is defined by the path of the cable from the spool to the pulley, and by the path of the cable from the pulley to the moving platform. Thus, the two straight portions of cable segment 32 define the plane of pulley 30 for one position and orientation of the moving platform.

Two embodiments are described. One has only three controllable cables, and obviously no element of the mechanism is capable of movement with six degrees of freedom. The other embodiment has six cables, and is obviously capable of attaining positions with six degrees of freedom. The claim is made that " . . . the manipulator is capable of describing any trajectory lying within the bounds of the workspace, e.g. straight lines, circular areas, etc. This is accomplished by causing the hydraulic motion to spool out each a cable to extend autonomously." There are two reasons why what is claimed cannot be accomplished by what is disclosed in the patent.

(a) One or more joy sticks, can be made to control six hydraulic valves independently, but the necessary extensions and retractions of cables to produce a desired motion of the platform are anything but intuitive. A human operator could certainly control the valves with such an arrangement, but could not reasonably predict the resulting motion. Inverse-kinematical solutions are not possible for all six-legged parallel linkages, but when they are possible they require a lot of computational power, because the interrelationships are complex.

Human directed master/slave control of some six-leg geometries is practical, whether using joy sticks or other human/machine interfaces. It will be appreciated, though, that the output signals from a joy stick should be an indication of the motion that an operator desires.

These signals should be input signals for a controller; they cannot be output control signals for precise, or even predictable, motions. The interface's output signals must first be translated by the computer's control software (which is based upon a kinematical solution) into the necessary commands for the six individual actuators. Thus, the claimed motion control cannot be obtained by direct joy stick (or equivalent) control of the valves.

(b) A far more serious flaw is found in the geometry of each of the six legs. The six legs move in a synergistically and very unpredictable manner as the platform moves, thereby changing the parallel mechanism's base geometry moment by moment. Changing the base geometry essentially creates a new and undefined parallel mechanism. Thus, a real-time inverse-kinematical solution is precluded, and the claimed controllability of the linkage is not achievable.

Consider the geometry depicted by the Prior Art figure. Cable segment 32 is a portion of a cable that is attached to the moving platform and that forms a pseudo-leg by passing tangentially around pivoting pulley 30 (beginning at a tangent point 40) at its base end, as it goes to the powered spool. It is obvious that as the platform moves in any direction that has a vector component in a direction of the pulley's pivot axis line 38, the tangent point of the cable as it reaches the pulley will change. Because the pulley pivots, as well as rotates, this tangent point will move unpredictably with two degrees of freedom as the platform moves. Thus, the tangent point is unsatisfactory as a defined leg-termination point.

If a line, defined by the upper straight portion of cable segment 32 as it extends from the moving platform to tangent point 40, is extended to reach the pulley's pivot axis line 38 (as shown by a phantom line 33), then that point of intersection can be considered to be the momentary base-end termination of the leg, shown in the figure as a virtual leg end 50. The point of intersection is defined by the current position of the cable, even though the cable does not go to the point. Since it is a geometrically precise leg end, but not a physical one, we may refer to it as a "virtual" leg end. Although it is not physical, it is a geometrical reality.

With the virtual-leg-end concept in mind, consider a family of leg lines for a given cable as the lines pass from a moving platform, along the cable and to a termination (virtual leg end) on pulley pivot axis line 38. A phantom line 34 is a portion of such a leg line that has a tangent point 42 on pulley 30 (tangent point 42 is forty-five degrees from tangent point 40) and that has a virtual leg end 48. Likewise, a phantom line 36 is a portion of such a leg line that has a tangent point 44 on pulley 30 (tangent point 44 is forty-five degrees from tangent point 42) and that has a virtual leg end 46. Phantom lines 33, 34, and 36 are but examples of a family of lines that are infinite in number and that are not coplanar.

It will be appreciated that the only geometrical feature that the family of lines have in common is that the base-end termination points all lie on a common line, which is collinear with pivot axis line 38 (as is shown by virtual leg ends 46, 48, and 50). Thus, each of the virtual leg ends moves with one translational degree of freedom, whereas the pulley tangent points move with two degrees of freedom. Thus, as defined, the virtual leg ends are the best leg ends that can be found for the geometry disclosed by the cited patent.

However, even though one degree of uncertainty per leg may be better than two degrees of uncertainty, it is still one degree too much. Movement of the platform causes the base ends of the legs to move unpredictably, and thus to be unknown. Further compounding the problem is the fact that although each of the six legs has one degree of uncertainty at its base end, the direction vector of that line of uncertainty is different for each of six legs.

The powered spool can indeed control the cable length as claimed. However, for the disclosed mechanism, controlling a cable length is not the same as controlling a mechanism-leg length. Changing the cable length creates a new, unknown, and unpredictable leg and thus, a different parallel mechanism. The problem is compounded by the fact that each link is influenced by every other link, thereby creating an extremely complex effect that is unpredictable.

BRIEF SUMMARY OF THE INVENTION

In accordance with the present invention, a parallel-link mechanism with six remotely-actuated tendon legs is controlled by a digital computer to produce accurate six-degrees-of-freedom motion and positioning of a platform. Tools, mechanical grippers, work pieces, and the like, may be mounted on the moving platform to accomplish useful work.

Objects and Advantages

Accordingly, several objects and advantages of the present invention are:

(a) To provide an improved parallel-linkage leg of very small diameter, that replaces active actuators as legs, and that closely approximates the "ideal leg" described above, thereby minimizing the work space lost by the mutual interference of two or more legs, and greatly reducing the momentum of the linkage to obtain significant operational benefits.

(b) To provide a geometry and design, for a parallel-link mechanism, with real-time-controllable six-degrees-of-freedom motion, that is capable of a wide range of scalability, thereby permitting very small and very large mechanisms to share what is substantially the same mechanical design and control software, and thereby greatly reducing design-and-development time and expense.

(c) To provide a parallel-linkage with legs of much greater retractability and extendibility than is possible with legs that are actuators, thereby increasing the potential work space of the end effector.

(d) To provide a parallel-linkage with greater stiffness and accuracy at long leg extensions than is associated with actuator type legs at nearly full extension, thereby effectively increasing the usable work space.

(e) To provide parallel-linkage legs that substantially reduce, or eliminate, the backlash problems associated with actuators that experience both tensile and compressive loads, thereby further increasing the stiffness and accuracy of each leg.

(f) To provide a parallel-linkage with legs that are not "jammed" or damaged when legs collide at certain platform positions, as described in (a) above, thereby eliminating downtime, and related expenses, for "unjamming" and repairing the linkage.

(g) To provide a parallel-linkage with a controllable "collision" force that is pre-settable, and that also has the ability to immediately release a person or an object that has been "pinned" by the linkage, thereby rendering the mechanism safer and more user friendly and also rendering the mechanism less likely to be damaged, or to cause damage, by a collision.

(h) To provide a six-degrees-of-freedom parallel-link mechanism with economical, robust, and non-intrusive position feedback.

(i) To provide a controllable parallel linkage with leg actuators capable of placement separate from the moving legs and potentially in a different environment, thereby permitting the linkage to be used in vacuum, under water, in clean rooms, in radioactive environments, etc., and also resulting in greater safety and ease for troubleshooting, maintenance, and repair.

(j) To provide a leg end pivot joint that is economical and that is not restrictive to any potential movement of the parallel linkage, and that provides for two, or more, legs to terminate with pivoting freedom at exactly the same point, thereby permitting economical and practical usage of a larger range of parallel-linkage geometries.

(k) To provide a six-degrees-of-freedom parallel linkage capable of real-time computer control with a human operator interface, thereby permitting a master/slave relationship that joins human direction with computer derived kinematical solutions to produce the desired motion.

(l) To provide a tendon type of parallel-linkage leg that can be extended and retracted by a remotely located actuator, in such a manner that the leg-end coordinates remain fixed and known (in their respective coordinate systems), and such that the actuator accurately controls the length of the leg between the known leg-end coordinates, thereby permitting an inverse kinematical solution for the parallel linkage. (The word "tendon", as used in this specification, is defined as a kinematical element capable of controlled longitudinal motion while transmitting a tensile force, and that possesses a relatively high longitudinal stiffness and great side bending flexibility, and that has a small and substantially constant cross-sectional area and geometry, e.g. music wire, or steel alloy cable).

Still further objects and advantages will become apparent from a consideration of the ensuing description and drawings.

BRIEF DESCRIPTION OF THE DRAWINGS

Supporting, fastening, and aligning members, such as would be obvious to one skilled in the art, are omitted in the figures to enhance clarity.

The Prior Art figure is a geometrical schematic that illustrates some kinematical features of the above cited U.S. Pat. No. 4,666,362 to Landsberger, et al. (1987).

Figure 1:
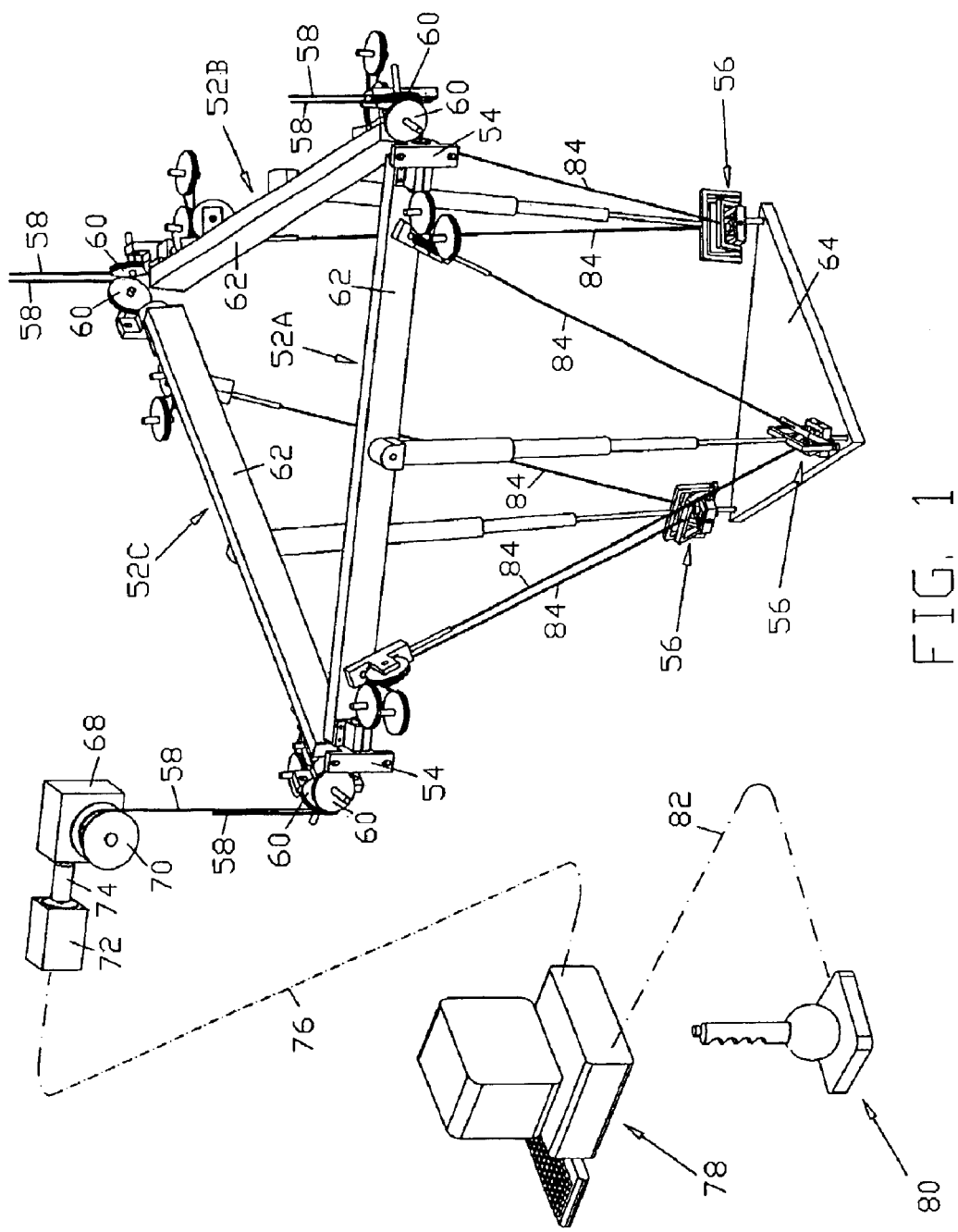
FIG. 1 is an oblique view of the preferred embodiment of the tendon-leg mechanism.

| Reference Numerals In The Drawings | |
|---|---|
| 30 | pulley |
| 32 | cable segment |
| 33 | phantom line |
| 34 | phantom line |
| 36 | phantom line |
| 38 | pivot axis line |
| 40 | tangent point |
| 42 | tangent point |
| 44 | tangent point |
| 46 | virtual leg end |
| 48 | virtual leg end |
| 50 | virtual leg end |
| 52A | leg-pair module |
| 52B | leg-pair module |
| 52C | leg-pair module |
| 53A | axis |
| 53B | axis |
| 53C | axis |
| 54 | bearing |
| 56 | pivot joint |
| 58 | tendon |
| 59 | apex |
| 60 | idler pulley |
| 62 | beam |
| 64 | platform |
| 68 | gear box |
| 70 | reel |
| 72 | servo motor |
| 74 | shaft coupling |
| 76 | data link |
| 78 | computer |
| 80 | joy stick |
| 82 | signal cord |
| 84 | leg |
| 85 | compression element |
| 86 | pivoting-pulley assembly |
| 88 | journal |
| 90 | tendon segment |
| 92 | journal mount |
| 94 | pivoting pulley |
| 96 | idler pulley |
| 98 | idler pulley |
| 100 | pivot axis |
| 102 | pivot shaft |
| 104 | pulley mount |
| 106 | tendon guide |
| 108 | leg axis |
| 110 | pulley-pivot axis |
| 112 | leg end |
| 114 | shaft encoder |
| 116 | shaft encoder |
| 118 | sprocket |
| 120 | belt |
| 122 | inner gimmal |
| 124 | post |
| 126 | outer gimmal |
| 128 | clevis |
| 130 | clevis |
| 132 | clevis |
| 134 | axis |
| 136 | axis |
| 138 | axis |
| 140 | leg segment |
| 142 | rod end |
| 144 | valve |
| 146 | tube |

DESCRIPTION OF THE INVENTION

Description—FIGS. 1 through 8

Figure 2:
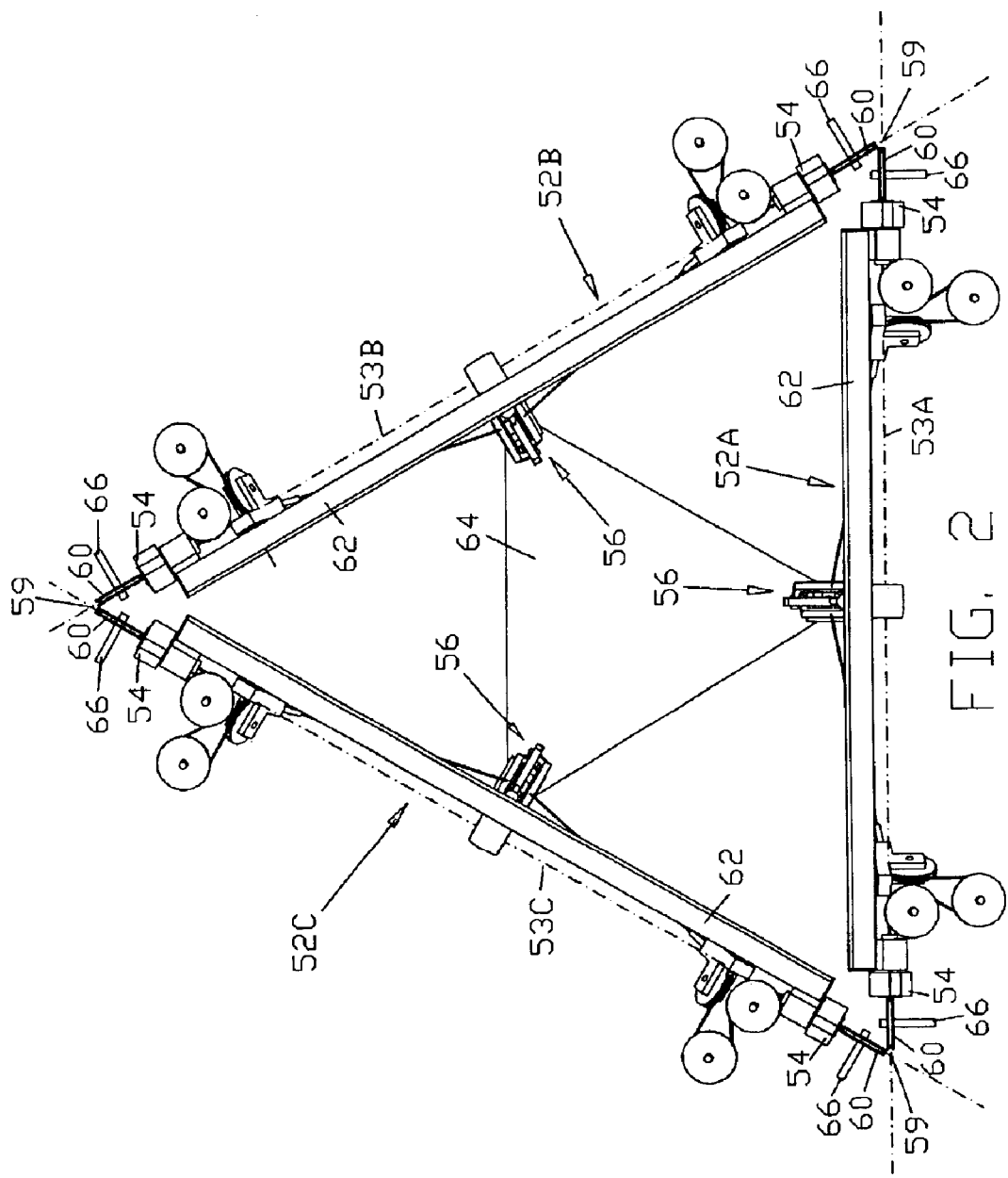
FIG. 2 is a plan view of the preferred embodiment shown in FIG. 1.

The preferred embodiment of the present invention is illustrated in FIGS. 1 and 2. A leg-pair module 52A (more particularly delineated in FIGS. 3, 4, and 5) is supported by a bearing 54 at each end of a base beam 62. The two bearings are rigidly mounted to a base structure (not shown) and together provide one degree of rotational freedom to leg-pair module 52A about an axis 53A (see FIG. 2). The base structure can be any rigid, supporting structure that provides the kinematical constraints required by the mechanism's base; most often it will be rigidly mounted to a ceiling, wall, or floor. However, it can be part of a platform that is itself moved and controlled by external means, e.g. a separate mechanism, or a vehicle. Beam 62 and the base structure may be considered to be two links joined by a single revolute joint, where two bearings 54 together form one revolute joint with a single rotation axis.

A lower apex of leg-pair-module 52A is formed by a multi-leg, multi-axis joint 56 (more particularly delineated in FIG. 8) which is attached near an apex of a moving platform 64. Platform 64 is the controlled element of the mechanism. Various types of end effectors, work pieces, powered tools, etc., can be attached to the platform to give them controlled position and motion.

Two additional leg-pair modules 52B and 52C (similar to leg-pair module 52A) are each likewise mounted with two bearings 54 to the base structure (forming a rotation axis 53B and a rotation axis 53C respectively), and joined to platform 64 by a joint 56. The three leg-pair modules 52A, 52B, and 52C are mounted (by bearings 54) in a triangular array such that the rotation axes 53A, 53B, and 53C form an equilateral triangle. FIG. 2 shows the three axes forming a triangle apex 59 at each axis intersection. The triangle formed by the three apexes is uniquely defined by the hardware of the mechanism, but is not itself physical; it will hereafter be referred to as the "virtual base triangle".

As its name implies, each leg-pair module has two legs 84. There is a wire, cable, or tendon 58 associated with each leg 84, that lies in a kinematically constrained tendon path along its working length. FIG. 1 shows how each tendon 58 leaves its associated leg-pair module along its associated rotation axis, threads around an idler pulley 60, and extends upward to be coiled on a reel 70. Idler pulley 60 and reel 70 define a segment of the constrained tendon path that is fixed relative to the base structure.

Reel 70 is mounted on an output shaft of a gear box 68, which is rigidly mounted to the base structure. A shaft of a servo motor 72 is connected to an input shaft of gear box 68 by a shaft coupling 74. With the proper digital commands, servo motor 72 can rotate reel 70 to precisely extend or retract tendon 58, thus the servo motor driven reel is a tendon-length-controlling actuator. Although each of six tendons 58 is associated with its own servo motor driven reel 70, only one is shown for reason of clarity.

Each servo motor controlled reel 70 is located remote from the moving linkages. The actual mounting locations for the reels are design decisions that are substantially independent of kinematical considerations. It should be appreciated that remotely located actuators can be placed in tailored environments that may be quite different from the environment of the mechanism. For example, the mechanism can be located underwater, while the actuators are located in a dry atmosphere. The tendons can be made to pass through a wiping seal.

Servo motor 72 can be precisely controlled by computer generated digital commands, and is preferably of the type offered by QuickSilver Controls, Inc. of Covina, Calif. Their product combines a digital servo controller, a precision shaft encoder, a servo driver, and a high torque servo motor in a compact housing suitable for industrial usage. The addition of a digital command source and a DC voltage, e.g. 48 volts, provide a compact and robust servo system suitable for the present invention.

Many types of speed reducers are suitable for gear box 68, however, a relatively-inexpensive worm drive, such as is commonly available, is very satisfactory. For example, an 80:1 ratio worm drive works very well, for the prototype of the present invention, with respect to speed and power, and provides power-off position holding, for convenience and safety.

A digital computer 78 uses a software or firmware control program (that is based on continually generating kinematical solutions for the mechanism) to generate digital control commands for each of the six servo motors. Consumer-market PCs are fast, robust, readily available, and relatively inexpensive; as such they are well suited for use as computer 78. A data link 76 provides a path for command and response signals between digital computer 78 and servo motors 72. Data link 76 may consist of an RS 232 to RS 485 converter connected to a serial port of digital computer 78 and an RS 485 cable running from the converter to the servo motors, for example.

A joy stick 80 is connected by its associated signal cord 82 to computer 78, to provide run-time human operator input for the control program. When the control program is in a "master/slave" mode, it generates kinematical solutions that will achieve the motion "chosen" by the human operator, as expressed by the joy stick. Thus, the output signals from the joy stick are input signals for the control software. Joy stick 80 can be replaced with any suitable human operator interface, e.g. a haptic wrist, that meets a given application's requirements.

Figure 3:
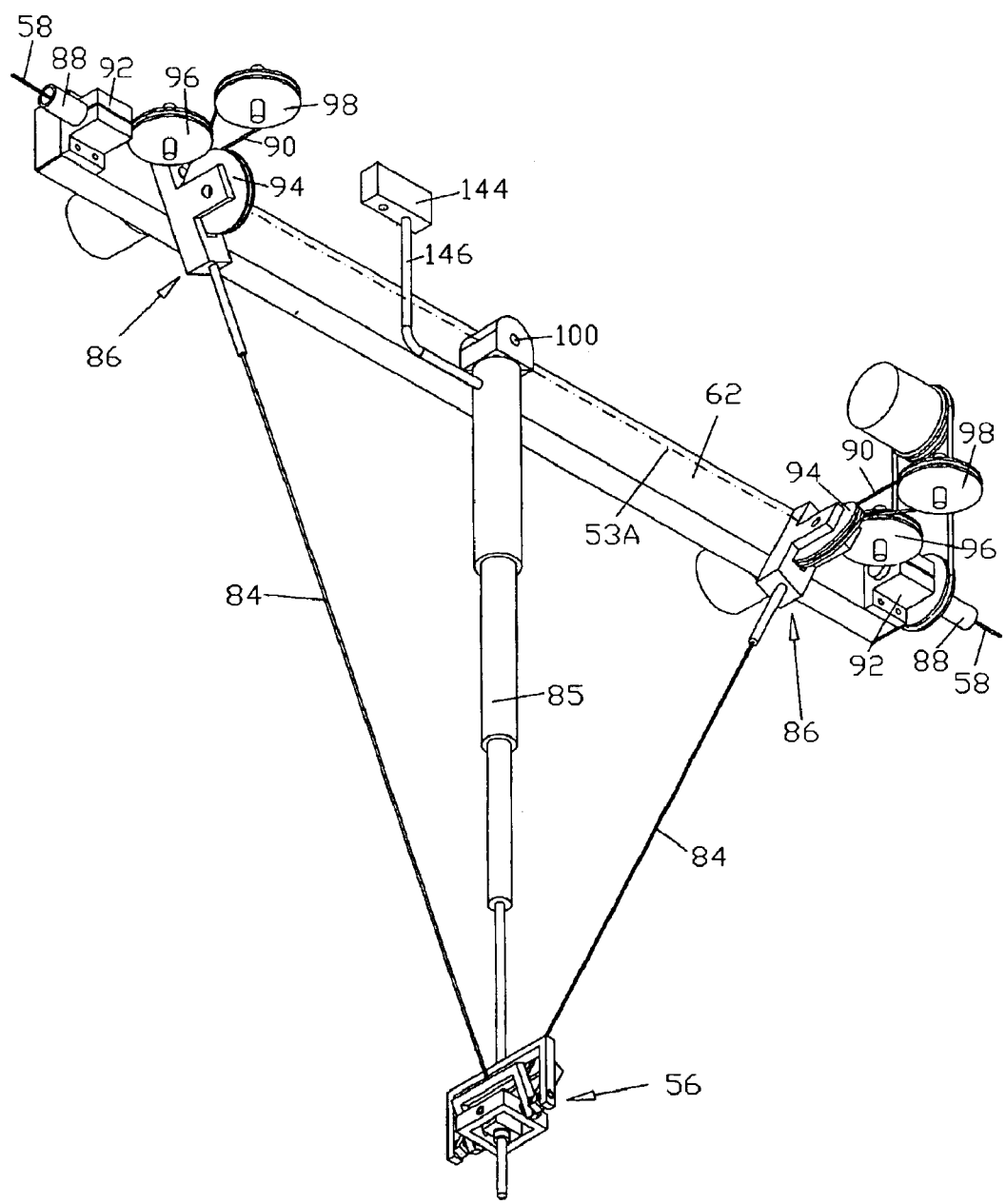
FIG. 3 is an upward-frontal-oblique view of a tendon-leg-pair module.

Refer to FIG. 3 for the following description of a leg-pair module.

Figure 4:
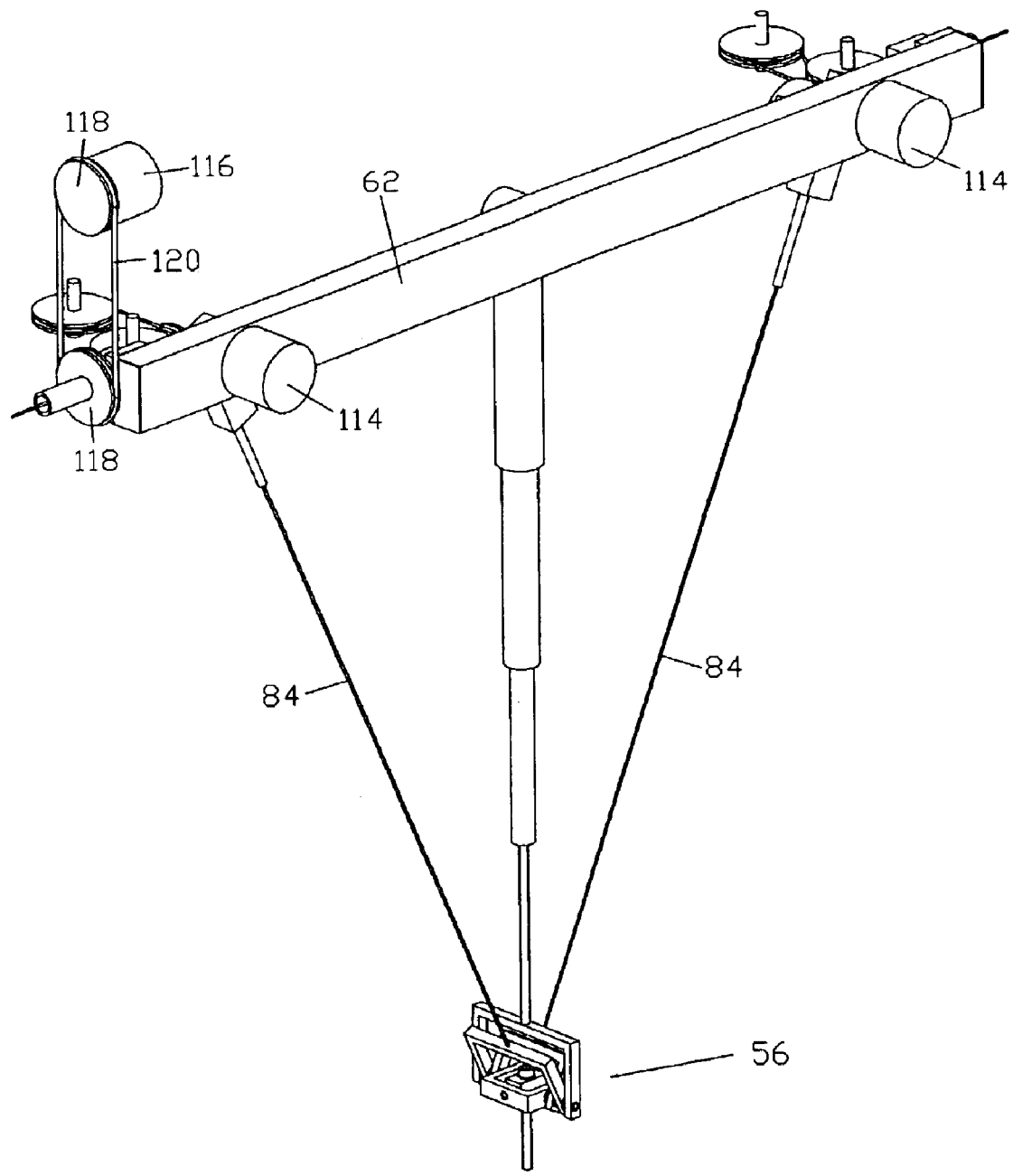
FIG. 4 is a downward-rear-oblique view of a tendon-leg-pair module.
Figure 5:
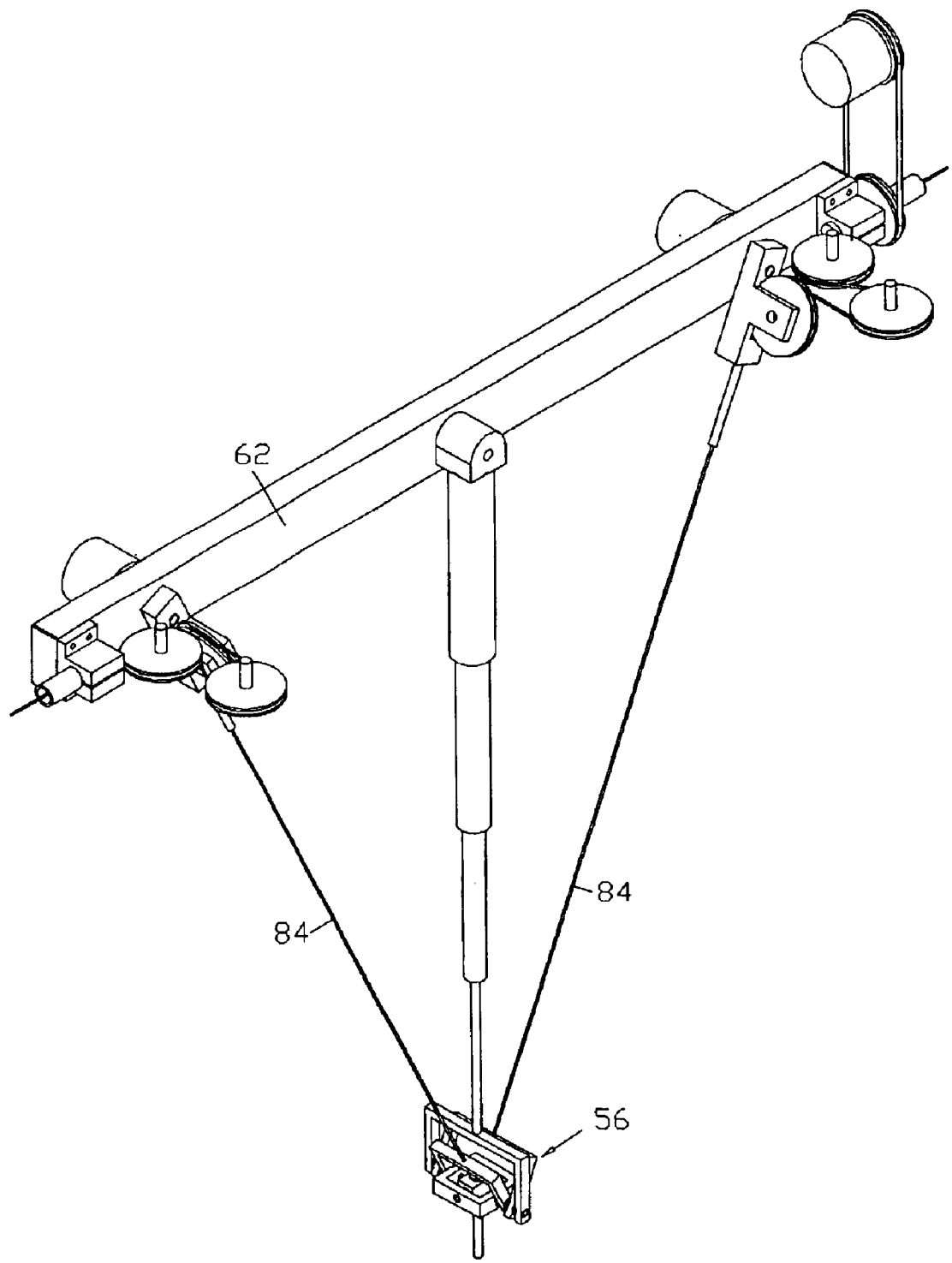
FIG. 5 is a downward-frontal-oblique view of a tendon-leg-pair module.

FIGS. 4 and 5 also, can aid in visualization. A compression element 85 terminates at its lower end in pivot joint 56 (the compression element may be a commercially-available telescoping pneumatic cylinder, for example). At its upper end, compression element 85 is mounted, to beam 62, with one degree of rotating freedom about a pivot axis 100 which intersects and is perpendicular to axis 53A. The longitudinal center line of the compression element also intersects axis 53A at the same point. Although the compression element provides a thrusting force, and can extend and retract as legs 84 require, it is a passive element and requires no control. It will work satisfactorily if supplied with a relatively constant source of air pressure, e.g. 60 psi.

A regulated compressed air source (not shown) supplies air to a valve 144. A flexible tube 146 provides for compressed air passage from the valve to the compression element. Valve 144 is preferably a two-state 3-way pneumatic valve. In one state, the valve supplies compressed air to the compression element. In the other state the valve exhausts the compressed air in the compression element to atmosphere. One valve 144 can serve the three compression elements of the complete mechanism.

Two tendon legs 84 each terminate, at their lower end, in pivot joint 56. Thus, two tendon legs and a compression element terminate in the same pivot joint, which is mounted on platform 64 (as shown in FIG. 1). The line vectors of legs 84 and of compression element 85 are always coplanar and always terminate at the same point relative to platform 64, because of the kinematical nature of the pivot joint. The pivot joint defines the lower apex of the leg-pair module and gives it pivoting freedom with respect to moving platform 64.

A journal mount 92 is rigidly affixed to each end of beam 62. A hollow journal 88 is rigidly held by each journal mount 92 such that the center line of each journal is collinear with axis 53A. When mounted in two bearings 54 (as shown in FIGS. 1 and 2), the two journals support the leg-pair module, with one degree of rotational freedom about axis 53A and with five degrees of constraint with respect to the base structure.

A pivoting-pulley assembly 86 is mounted on beam 62, with one degree of pivoting freedom, near each end of the beam. The pivoting-pulley assembly has a pivot shaft 102 (shown in FIG. 7) which is mounted in a bearing (not shown) in beam 62, thus defining a pulley-pivot axis 110. Pulley-pivot axis 110 intersects and is perpendicular to axis 53A. Pulley-pivot axis 110 is parallel to pivot axis 100 of compression element 85. Thus, beam 62 and pivoting-pulley assembly 86 may be considered to be two links joined by a revolute joint with a single rotation axis. Pivoting-pulley assembly 86 has one degree of rotational freedom with respect to beam 62, and two degrees of rotational freedom with respect to the base structure, since the rotation axes are linearly independent.

Figure 7:
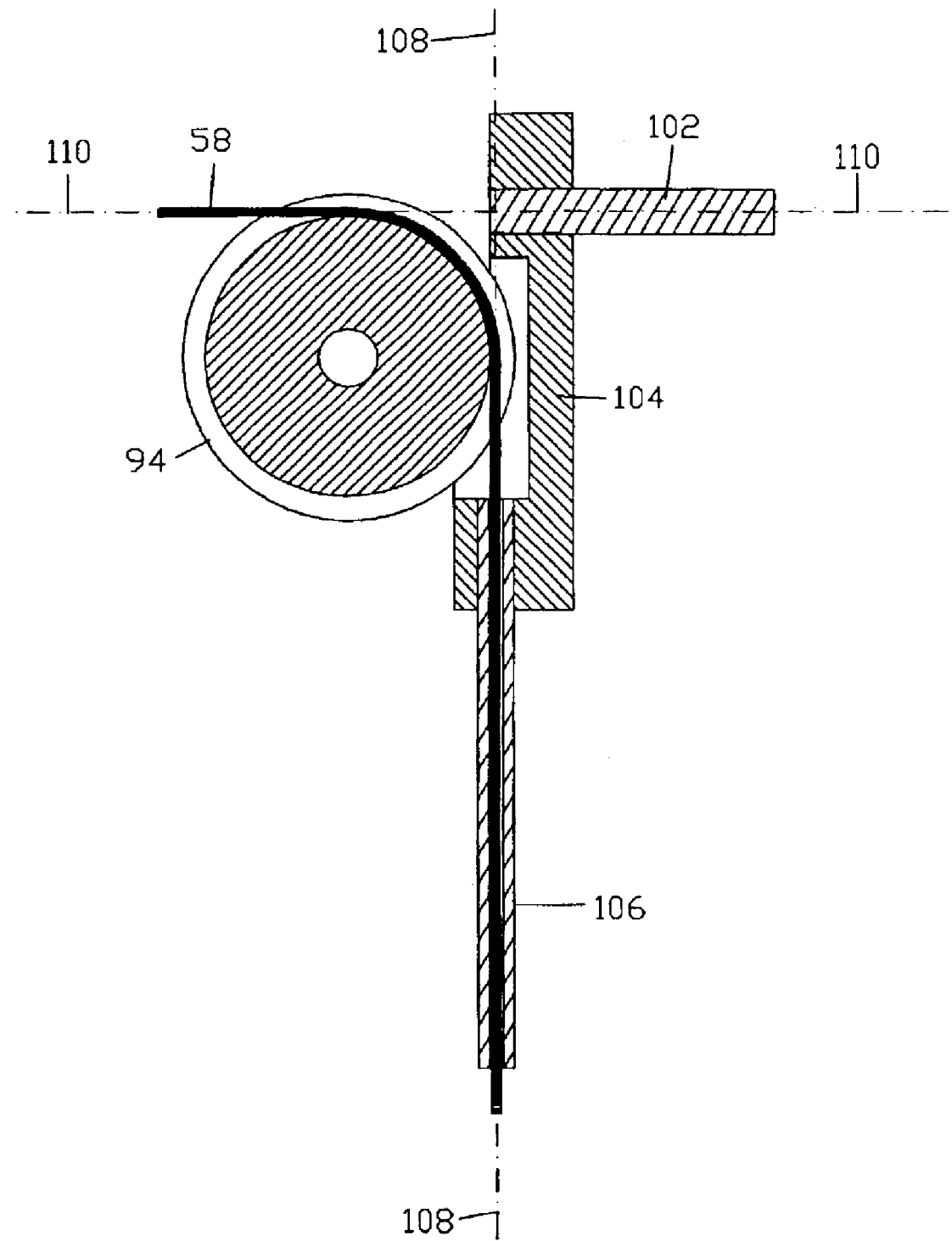
FIG. 7 is a center-line cross-sectional view of a pivoting-pulley assembly.

Referring to FIG. 7, a pivoting pulley 94 is mounted with one degree of rotational freedom in a pulley mount 104. Pulley mount 104 has one degree of rotational freedom about pulley-pivot axis 110. Thus, pivoting pulley 94 has two degrees of rotational freedom with respect to beam 62: one about its own center-line axis, and one about pulley-pivot axis 110. Pivoting pulley 94 is in fixed relationship to pivot shaft 102 such that pulley-pivot axis 110 is tangent to the pitch circle of pivoting pulley 94.

Figure 6:
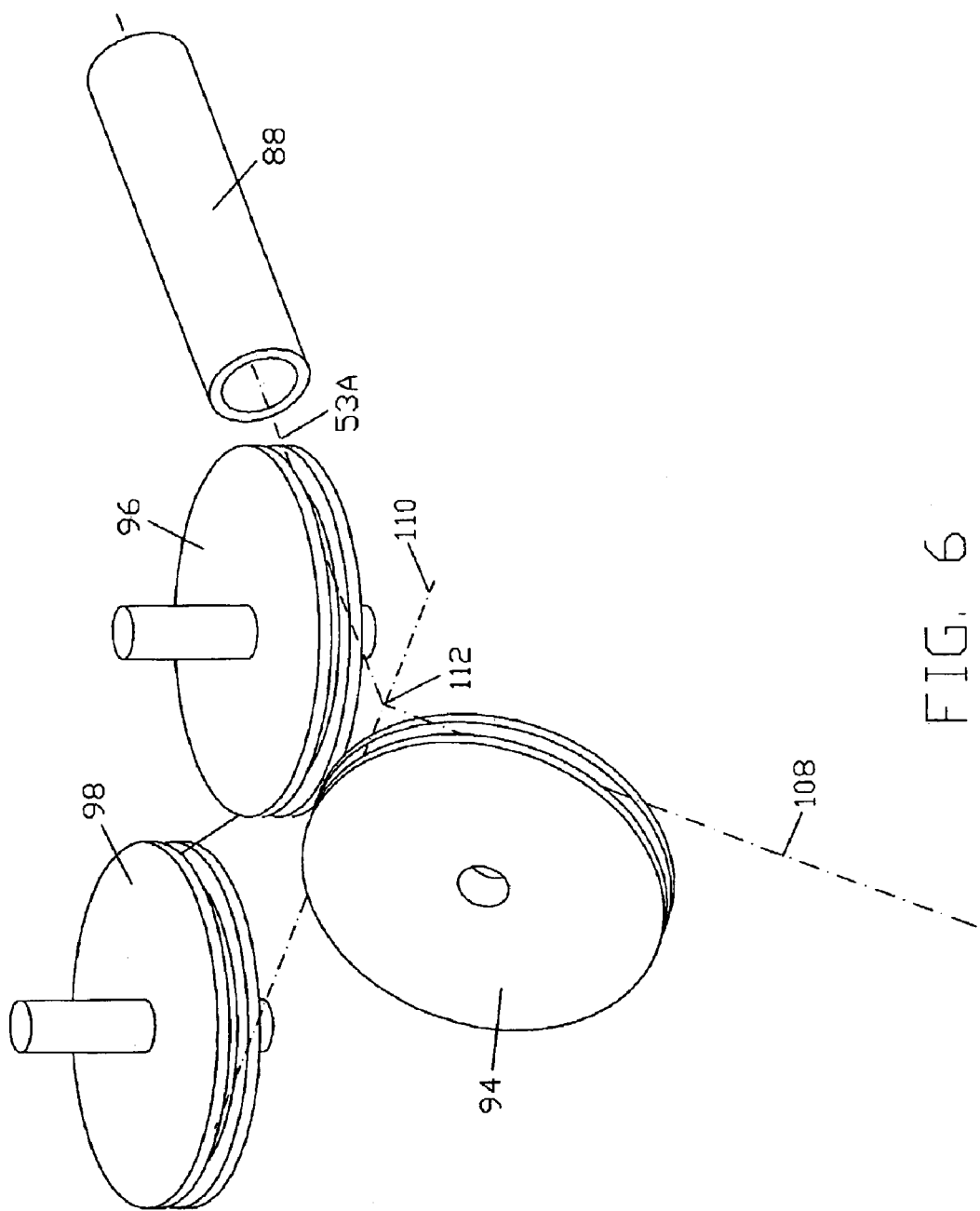
FIG. 6 is a geometrical schematic that illustrates some kinematical essentials of the tendon's path for each of the parallel legs.

A hollow, tendon guide 106 is rigidly affixed to pulley mount 104 such that the center line of the tendon guide is collinear with leg axis 108 (leg axis 108 is collinear with a line vector of the leg that represents the leg for analysis). The inside diameter of the tendon guide is such as to provide an easy sliding fit for its associated leg tendon 58. Leg axis 108 is tangent to the pitch circle of pivoting pulley 94, and intersects pulley-pivot axis 110 perpendicularly; the leg axis also intersects axis 53A at the same point of intersection, but at a variable angle. FIG. 6 more clearly shows these lineal relationships. Pivoting pulley 94 and tendon guide 106 together define a segment of the constrained tendon path that is fixed with respect to the pivoting-pulley assembly.

Referring to FIGS. 3, 5 and 6, near each end of beam 62 a redirecting idler pulley 96 is rigidly mounted with one degree of rotational freedom to beam 62 and with its pitch circle tangent to axis 53A. A positioning idler pulley 98 is rigidly mounted with one degree of rotational freedom to beam 62 near each end, with its pitch circle tangent to pulley-pivot axis 110. Idler pulley 96 and idler pulley 98 are so positioned that their pitch circles lie in a common plane with axis 53A and with pulley-pivot axis 110. Idler pulley 60, idler pulley 96, and idler pulley 98 together define a segment of the constrained tendon path that is fixed with respect to beam 62.

Figure 8:
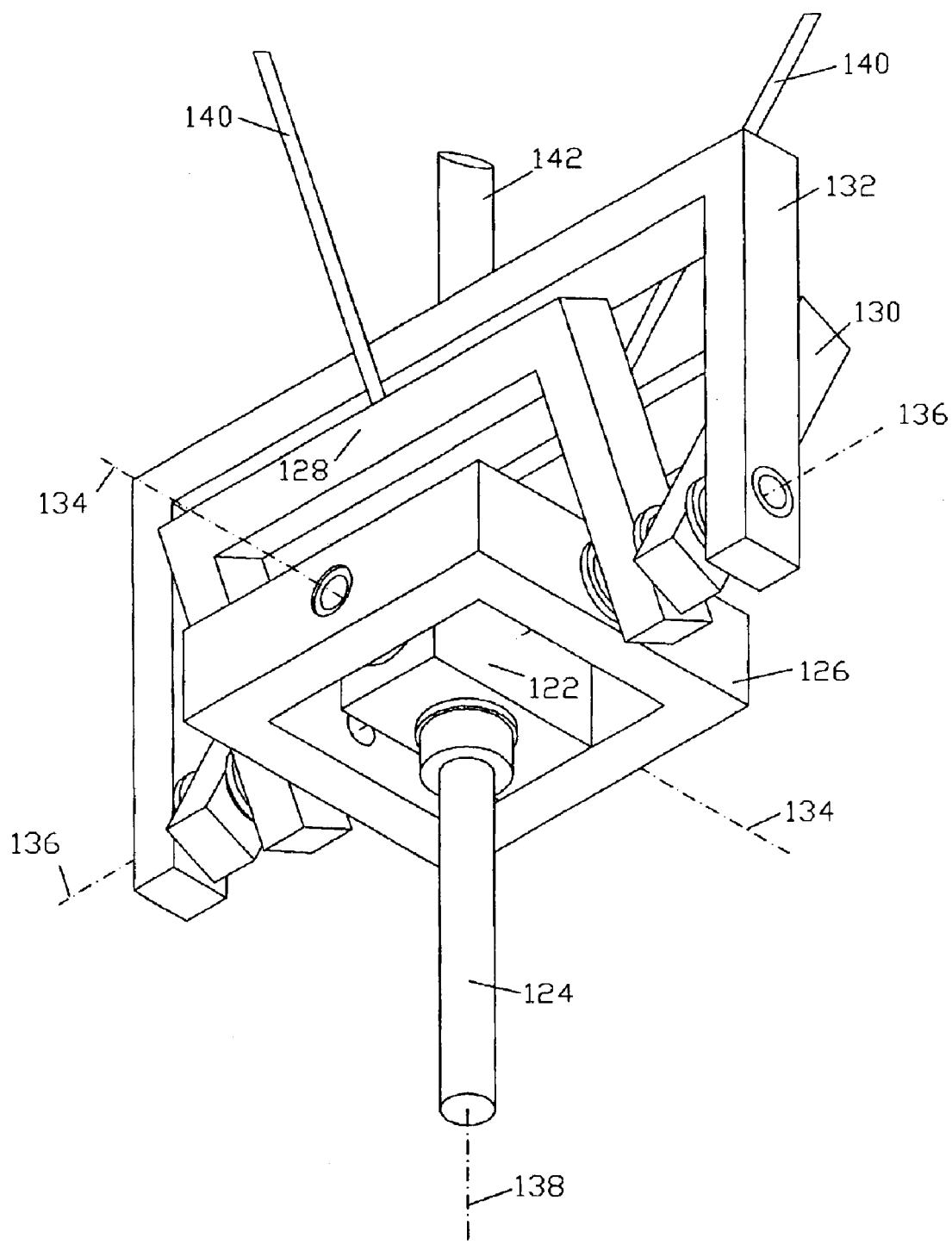
FIG. 8 is an enlarged view of a pivot joint that is shown in combination in other views.

Tendon 58 enters the leg-pair module through hollow journal 88 and collinear with axis 53A. It threads around idler pulley 96 and around idler pulley 98. Leaving idler pulley 98, it threads around pivoting pulley 94 and through tendon guide 106 (as shown in FIG. 7), and then on to a termination in pivot joint 56 (as shown in FIGS. 1 and 8). A straight tendon segment 90 is formed between idler pulley 98 and pivoting pulley 94. Tendon segment 90 is collinear with pulley-pivot axis 110. Also, as is evident from FIGS. 1 and 3, there is a straight tendon segment (not shown) between idler pulley 60 and idler pulley 96, since the tendon has no contact with any member between the two idler pulleys, and is necessarily collinear with axis 53A.

FIG. 4 shows the opposite side of the leg-pair module. A shaft encoder 114 is located near each end of beam 62. Each shaft encoder 114 is so placed and mounted as to accurately determine the angular position of pivot shaft 102 about pulley-pivot axis 110 (see FIG. 7), with respect to axis 53A. A DC voltage source, and a data link with computer 78 (both not shown) are provided for each shaft encoder in a common manner. Each of two legs 84 is associated with its own shaft encoder 114. Thus, the angle that either leg 84 makes with axis 53A can be determined continually by computer 78.

At one end only of beam 62, and rigidly attached to journal 88 is a toothed-belt sprocket 118. A toothed belt 120 connects the sprocket to another toothed-belt sprocket 118 that is attached to a shaft of a shaft encoder 116. Shaft encoder 116 is rigidly mounted to the base structure. A DC voltage source, and a data link with computer 78 (both not shown) are provided for the shaft encoder. Thus, the angle of rotation about axis 53A that the leg-pair module makes with respect to the base structure can be determined continually by computer 78. There are many commonly used methods for mounting an encoder to read angles of rotation about a given axis. Other mounting methods that provide the same angular indications will be equally satisfactory.

Shaft encoders suitable for use as shaft encoders 114 and shaft encoders 116 are mass produced precision transducers, and thus are relatively inexpensive. Currently available shaft encoders are designed for industrial usage and are small and robust. As used with the preferred embodiment, they are located at the base end of the mechanism, and thus do not infringe upon the work space; they provide means for obtaining position feedback without interfering with the legs or the moving platform.

Shaft encoders 114 and shaft encoder 116 are optional for the preferred embodiment. They may be omitted if position feedback is not required. If they are used, all three shaft encoders must be used for each of the three leg-pair modules, thus, requiring nine in total. FIGS. 1 and 2 depict the preferred embodiment without the shaft encoders for reason of clarity.

FIG. 8 is an enlarged view of one of the pivot joints shown in FIG. 3. A leg segment 140 (the bottom portion of one leg 84) terminates, with rigid attachment, at the center of a clevis 128. A leg segment 140 (the bottom portion of the other leg 84) terminates, with rigid attachment, at the center of clevis 130. A rod end 142 of compression element 85 terminates, with rigid attachment, at the center of clevis 132. The devises are sized to be nestable, so that they can share a common axis of rotation.

Clevises 128, 130, and 132 are attached to an outer gimmal 126, each with one degree of rotational freedom about an axis 136. Outer gimmal 126 is attached to an inner gimmal 122 with one degree of rotational freedom about an axis 134. Inner gimmal 122 is attached to a post 124 with one degree of rotational freedom about an axis 138, which is collinear with the center line of the post. The rotating attachments are made with shafts and bearings in a common manner.

As described above, the two legs and the compression element of a leg-pair module lie in a common plane, no matter what motion takes place. Therefore leg segments 140 and rod end 142 lie in a common plane, and each is always perpendicular to its respective clevis. The pivot joint is so proportioned that axis 134, axis 136, and axis 138 intersect at a common, and invariant, point within post 124. Post 124 is attached to platform 64, as shown in FIG. 1; therefore two legs 84 and compression element 85 effectively terminate at a common, known, and invariant point with three degrees of rotational freedom, relative to platform 64. This point is hereafter referred to as the "platform leg end" for an associated leg. Pivot joint 56 provides an economical means of obtaining multi-leg termination, at a common point, with unrestrictive pivoting freedom.

Most of the mass of each leg-pair module is concentrated near rotation axis 53A. The only possible movement of most of the mass is relatively slow rotation about axis 53A, for short arcs. Thus, the momentum is negligible. To improve balance, mass should be added to beam 62 (close to axis 53A) to counter balance it. It should be balanced, with the compression element in an average position, so that there is no significant weight-induced torque about axis 53A for the leg-pair module.

It will be appreciated that the above descriptions pertaining to leg-pair module 52A apply also to leg-pair modules 52B and 52C.

Description of Operation—FIGS. 1 through 8

There are several diverse disciplines of mathematics, mechanics, and computer science involved in the analysis, synthesis, and real-time computer control of mechanisms like the present invention. Some authorities have brought these diverse disciplines, as well as others, together under the umbrella heading of "robotics". There are terms and concepts mentioned in the following that, while familiar to those skilled in the art, may be unfamiliar to some with a more specialized interest in the present invention. An excellent practical treatment of the pertinent disciplines, nomenclature, and especially the mathematical operations, can be found in: "Introduction to Robotics—Mechanics and Control" by John J. Craig, ©1986 by Addison-Wesley Publishing Company, Inc.

As stated in the above discussion of prior art, it is convenient to work with two different right-hand orthogonal-axis coordinate systems. One of the coordinate systems is fixed in location and in orientation with respect to the non-moving (base) parts of the mechanism, and is designated above as the "fixed system". The origin of the axes of the fixed system may be located at any convenient point. However, it is beneficial to orient the fixed system such that its x and y axes form a plane that is parallel to the virtual base triangle defined by apexes 59, and such that the positive direction of the z axis is upward (as upward is depicted in FIG. 1).

The other coordinate system is rigidly affixed to the moving platform, and is designated above as the "platform system". It is convenient to locate the origin of the platform system at the center of a "virtual platform triangle" formed by the three unique platform-leg-end points (each defined by one of three pivot joints 56 that are mounted to platform 64). It is also convenient to orient the platform system such that its x and y axes lie in the plane of the virtual platform triangle, and such that its z axis is directed generally upward (as upward is depicted in FIG. 1). It is also convenient to define the x axis by a line from the center of the virtual platform triangle, through one of the apexes of the triangle.

Each leg's base end can be readily determined in the fixed system from the known geometry and dimensions of the mechanism, and each leg's platform end can be readily determined in the platform system, from the known geometry and dimensions of the mechanism.

Also, as stated in the above discussion of prior art, if the mechanism is to provide six degrees of freedom, with real-time computer control, an inverse kinematical solution must be obtainable in real time; a solution is of no use if it cannot be obtained quickly enough to satisfy the dynamic needs of the operating mechanism. The preferred embodiment qualifies by:

(a) providing six variable-length legs connecting a base structure to a movable platform; such that the legs provide six degrees of freedom for the desired motion, and six degrees of constraint for any undesired motion, (b) providing one end of each leg with pivoting freedom, at a point that is fixed and known in the platform system, (c) providing the other end of each leg with pivoting freedom, at a point that is fixed and known in the fixed system, and (d) having a controlled change in length of each leg's tendon create exactly the same change in the leg's length.

Referring to FIG. 3, each leg 84 of the preferred embodiment is one of a pair that is part of a leg-pair module. As described above, the line vectors of the legs and of the compression element 85 are coplanar and intersect at a precisely defined point ("platform leg end") in pivot joint 56, which is attached to platform 64. The platform leg end is precisely the point of intersection of rotation axes 134, 136, and 138 (see FIG. 8). Because the three rotation axes are linearly independent lines, the leg-pair module has three degrees of rotational freedom with respect to platform 64, and can thus accommodate the motion of the platform without joint lockout. This feature increases the work space available for the platform.

Because the two legs and the compression element are coplanar, the thrusting force vector of the compression element can be resolved into two vector components that are respectively collinear with the two leg line vectors. Thus, no matter what position platform 64 attains in the working space, the two legs will always be in tension, and the compression element will never transmit a force to the platform. Thus, each leg terminates with a tensile force load. A tendon, as defined above, always forms a straight line while in tension. The magnitude of leg tension is controlled by setting the pressure of the air supplied to compression element 85.

Compression element 85 must have a diameter sufficient to prevent column buckling and sufficient to provide the necessary thrusting force. However, the diameter of the compression elements is not a problem as it can be with the legs; each compression element is shielded from collision with other linkage members by its two associated legs. Any mechanism element will collide with one of the legs before reaching the compression element. Therefore, while leg diameter directly affects the working space, compression element diameter does not.

Tension in the tendon of leg 84 will always cause it to be collinear with a straight line from the platform leg end (in one of the pivot joints) to base leg end 112 (see FIG. 6). Because of the tension, the tendon lying within tendon guide 106 will cause the tendon guide to pivot about pulley-pivot axis 110 and about axis 53A as needed to remain collinear with the leg axis 108 (any misalignment will result in a correcting moment).

For any leg 84, base leg end 112 is defined by the point of intersection of axis 53A, pulley-pivot axis 110, and leg axis 108. The lines of these three axes are linearly independent, thereby providing the two degrees of rotational freedom required by the leg. The kinematics of this arrangement are such that as the leg-pair module rotates about axis 53A, and pivoting pulley 94 rotates about its axis, and leg 84 pivots about pulley-pivot axis 110, base leg end 112 remains fixed and with known coordinates in the fixed system. Thus, the kinematical integrity of the base leg end is ensured as the leg pivots and changes in length.

When the disclosed tendon leg is in tension, it very closely approximates the "ideal leg" described above, that is, it:

(a) acts like a force vector with a thickness approaching zero, e.g. 0.062 inch, (b) is capable of precisely-controllable extension and retraction, (c) is free from the danger of column buckling, (d) substantially eliminates mechanical system backlash.

Because the tendon has a very small diameter, compared with actuator legs, leg collision space is minimized and work space is maximized. Because the tendon leg has very little mass, compared with actuator legs, link momentum is minimized, thereby significantly improving the mechanism's dynamic characteristics. Because the tendon has no moving parts and operates in pure tension, long leg extensions do not decrease mechanism stiffness and accuracy, as they do with actuator legs. Because the tendon is accumulated on reel 70 away from the leg, the leg does not have the relative extension and retraction constraints that actuator legs must have.

Because the tendon is always in tension during operation, gears, screws, cylinders, etc., are always loaded from the same side, and backlash is substantially eliminated. For example, gear box 68 is preferably a worm drive. With the load always in tension, the same face of the worm and the same faces of the teeth of the worm gear are always providing the transmitted force, thus, there is no switching between opposing tooth faces, which is the primary source of backlash. Normally, wear of gear elements increases backlash, because opposing tooth faces grow further apart. However, when the load is always in tension, there is no load reversing and tooth wear does not degrade the dynamics of the gear box.

A long tendon can be accumulated on a small reel, thereby enabling a small actuator to control a very long leg. Remotely located actuators permit very small mechanisms to be operated by larger actuators without interference. This condition is not attainable with actuator legs. Thus, the tendon link of the present invention provides for scalability of designs; the same basic design can be used for small to large mechanisms.

The control software does not consider compression element 85 at all. It performs its control functions as if each tendon leg is stiff in extension and retraction; thus, the leg does function as if it were a force vector that cannot buckle or be bent. If a leg is in pure tension, there can be no side loading or bending, and no "play" caused by relative movement of leg components (as with actuators).

Because each end of leg 84 is known and invariable in its respective coordinate system, and because the entire path of each tendon, from reel 70 to pivot joint 56 is kinematically constrained (by physical constraints, e.g. pulleys or low friction surfaces), relative to some mechanism elements, a length of tendon as it is wound onto, or unwound from, its reel causes the length of the leg to change by exactly the same length.

An infinitely stiff leg is desirable during operation. However, a relaxed leg is desirable during an emergency, so that binding forces are eliminated and jams are undone. In normal operation valve 144 supplies pressurized air to the compression elements, and the legs are rigid. In an emergency, the state of the valve is switched (automatically or manually) and the compression elements lose their pneumatic force, causing the legs to become limp. With the legs limp there is no longer a jam and no longer any crushing force. Thus, the valve is used to "undo" a jam or to free a pinned person or object. With the air pressure removed, platform 64 can easily be moved by hand.

The control software performs as if the tendon legs can push as well as pull. However, this is kinematically valid only as long as the force of the compression elements can keep the leg tendons in tension. The force that platform 64 (or any of the legs) can exert on a person or object is limited by the force exerted by the compression elements. It should be appreciated that the platform force can be controlled by changing the pressure of the air supplied to the compression elements. If the platform tries to push on an object harder than the compression elements can accomplish, some or all of the tendons will become slack and movement in the direction of the resistance will stop. This is the opposite of the case when actuators are used as legs. Thus, maximum collision force can be controlled for a given application.

Not all applications for the preferred embodiment need position feedback; open loop operation is satisfactory for many operations. However, for those applications that would benefit from position feedback, the present geometry and apparatus makes it practical for the control software executed by computer 78 to generate a real-time forward kinematics solution.

Referring to FIG. 4, because each leg 84 is part of a leg-pair module there are simplifications that aid in obtaining a forward kinematical solution. Because both of the legs always lie in a plane that has one degree of rotational freedom, it is obvious that there is no rotation about the center line of a leg. Thus, each leg has two degrees of rotational freedom at its base end. Each leg can rotate about its associated pulley-pivot axis 110, and can also rotate about axis 53A. However, the rotation about axis 53A is always the same for both legs.

It can be seen that each leg pair forms a triangle (hereafter referred to as the "leg triangle"), with the legs forming two sides of the triangle and intersecting at the platform leg end in pivot joint 56 to form the triangle's lower apex. The remaining side of the triangle (the triangle base) is a line from base leg end 112 of one leg to base leg end 112 of the other leg of the pair. Since the base leg ends are accurately known in the fixed system, the length, direction, and location of the triangle base are obtainable. It is significant that the triangle base is collinear with axis 53A and therefore the rotation of the triangle about its base can be determined from the output of its shaft encoder 116 (rotation about the triangle base is arbitrarily taken to be 0 degrees when the leg triangle is vertical). The angle that each leg 84 makes with the triangle base can be determined from the output of its associated shaft encoder 114.

Because the end coordinates of the triangle base are fixed, and known in the fixed system, and because the angle that each leg makes with the triangle base can be continually obtained, all elements of the triangle can be determined. The further angle information supplied by shaft encoder 116 makes it possible to determine the fixed system coordinates of the triangle parts. One of these parts is the platform leg end.

The following briefly outlines how the control software of computer 78 can utilize data from shaft encoders 114 and shaft encoders 116 to obtain a forward kinematical solution for position feedback. Choosing any one of the leg triangles, use the fixed system coordinates of the left end (per FIG. 3) of the triangle base to create a position vector P$_{BASE}$ for the point. Using the fixed system coordinates of both ends of the triangle base, create a unit vector U$_{BASE}$, from the end of P$_{BASE}$, in the direction of the base line.

Assume that initially the leg triangle is vertical (0 degrees). Using the length of the triangle base and the two leg angles (determined from shaft encoders 114), calculate the left leg length, the length of the altitude, A, of the leg triangle, and the distance, D, from the left end of the triangle base to its intersection with the line of the altitude. Multiply U$_{BASE}$ by D to get a vector from P$_{BASE}$ to the altitude; add this vector to P$_{BASE}$ to get a fixed-system position-vector P$_{ALT}$ to the top end of the altitude line.

Since the leg triangle is assumed vertical, the altitude line is parallel to the z axis. Thus, the altitude vector VALT must be: 0x+0y−Az. The triangle was assumed to be at 0 degrees, however, it is actually at some angle Theta as determined from shaft encoder 116. To get the corrected orientation for VALT, use a vector rotation operator to rotate it by an angle Theta, about the unit vector UBASE.

With vector VALT thus corrected, its head is exactly at the platform leg end for both legs. To get position vector PLEG-END, add vectors PALT and VALT. The vector components of PLEG-END give the fixed system coordinates of the platform leg end directly.

By performing the same analysis for all three leg-pair modules, the fixed system coordinates are obtained for all three platform leg ends, thus defining the virtual platform triangle in the fixed system. With the virtual platform triangle defined in fixed system coordinates, the unit vectors of the platform system coordinate axes can easily be obtained in fixed system coordinates, thereby enabling all platform system position vectors to be converted to fixed system coordinates. Thus, the forward kinematical solution is obtained and position feedback accomplished.

Conclusion, Ramifications, and Scope

Accordingly, the reader will see that the tendon link method and mechanism of this invention can be used to provide precisely controlled six-degrees-of-freedom motion and positioning with a safety, economy, and effective workspace not obtainable with prior art. Specifically:

- it provides a small diameter tendon leg, that eliminates active-actuator legs, thereby maximizing the work space, and minimizing linkage momentum to obtain significant operational benefits.
- it provides a parallel-linkage geometry and design, that is capable of a wide range of scalability, thereby creating reusable mechanical designs and control software, thus greatly reducing design-and-development time and expense.
- it provides a parallel-linkage with legs of much greater retractability and extendibility than is possible with actuator type legs, thereby greatly increasing the potential work space of the tool or end effector.
- it provides a parallel-link mechanism with greater stiffness and accuracy at long leg extensions than can be obtained with active-actuator legs at nearly full extension, thereby effectively increasing the usable work space.
- it provides parallel-linkage legs that substantially reduce, or eliminate, the backlash problems associated with actuators that experience both tensile and compressive loads, by making actuator loads always tensile, thereby further increasing the stiffness and accuracy of each leg, and improving the dynamic response.
- it provides a parallel-link mechanism with legs that will not jam or be damaged as legs collide, thereby eliminating downtime, and related repair expenses.
- it provides a parallel-link mechanism that has a controllable maximum collision force, and that can be made to immediately release a person or an object that has been "pinned" by the linkage, thereby significantly improving safety, while also reducing the likelihood of mechanical damage by collisions.
- it provides a six-degrees-of-freedom parallel-linkage mechanism with economical, robust, and non-intrusive position feedback.
- it provides a controllable parallel linkage with leg actuators that can be located away from the mechanism and in a different environment, thereby enabling the mechanism to be used in vacuum, under water, in clean rooms, in radioactive environments, etc., while providing greater safety and ease of troubleshooting, maintenance, and repair.
- it provides a leg end pivot joint that is economical and that does not restrict potential linkage movement, and that provides for two, or more, legs to terminate with pivoting freedom at exactly the same point, thereby permitting economical and practical usage of a larger range of parallel-linkage geometries.
- it provides a six-degrees-of-freedom parallel linkage capable of real-time computer control combined with real-time human operator input, thereby permitting master/slave and teleoperator relationships that joins human direction with computer derived kinematical solutions to produce the desired motion.
- it provides a tendon-link leg that can be extended and retracted by a remotely located actuator, in such a manner that leg-end coordinates remain fixed and known (in their respective coordinate systems), and such that the actuator accurately controls the length of the leg between the known leg-end coordinates, thereby permitting an inverse kinematical solution and real-time computer control.

For the preferred embodiment, the three leg-pair modules are similar and are arranged to form an equilateral triangle as defined by apexes 59. This geometry provides some mathematical conveniences, but is not necessary for proper operation. The leg-pair modules can all be different, and the three apexes can form other than an equilateral triangle. As long as the kinematical constraints are maintained and the control software reflects the actual geometry, it will work properly.

It will be appreciated that beam 62 is a link structure that can be provided in many ways and with many geometries, as long as the kinematical nature of the link and its joints are maintained. For examples, for a large mechanism the beam could be replaced with a space frame structure to provide rigidity with light weight, and a neutrally buoyant link could replace the beam for a large underwater mechanism.

FIG. 1 shows the servo motor driven reel as being above the leg-pair modules. As long as the tendons enter the leg-pair modules collinear with the rotation axis, it does not matter where the tendon actuators are located, as long as they are not in the work space or the leg space. The kinematics of the mechanism are independent of the actuators' locations.

Any type of controllable actuator that can extend and retract a tendon along a line, will be satisfactory kinematically. Thus, a hydraulic servo valve driving a hydraulic motor with a reel will work well for high force applications. Likewise, a hydraulic cylinder, so driven, will work well. Replacing the servo motors of the preferred embodiment with stepper motors will work for some applications. Even ball screw and acme screw actuators can be used without kinematic penalties. Because the tendon loading is always tensile, backlash is reduced or eliminated. The controllable linear motion of piezoelectric and magneto-strictive actuators make them suitable for very small mechanisms.

A telescoping cylinder was chosen for the compression element 85 for the preferred embodiment because of its great range of extensibility. Any compression element with a range of extension and retraction sufficient for an application, and with sufficient force capacity, will work if it physically meets the size constraints. The prototype of the preferred embodiment has a length of sixty inches between apexes 59; the compression elements are standard two inch diameter air cylinders, with a 32 inch stroke. Part of the air cylinders' bodies were extended upward past pivot axis 100, thus permitting an extended range of extension and retraction from the pivoting point of pivot axis 100.

Because of the scalability of the design, mechanical springs can be used as compression elements for small designs. Sealed air springs can be used for some applications, eliminating the need for a pressurized gas source.

For large designs, where a more limited work space is satisfactory and where the platform supported weight is sufficient, the compression elements can be omitted if the platform weight vector components, along the legs, are sufficient to keep all legs in adequate tension. This approach can be suitable for applications where the mechanism is used in the manner of a loading crane, for example. However, if any leg vector becomes so oriented that the tendon tension is not maintained, the motion will become indeterminate.

The preferred embodiment is shown in a vertical attitude. It is obvious that the mechanism can operate with the same kinematics, in any attitude. The high stiffness to weight ratio of the tendon legs makes all-attitude operation practical.

The preferred embodiment employs the tendon mechanism link design of the present invention for the six legs of a Stewart platform type of mechanism. It will be appreciated that the disclosed tendon link can be used, singly or in combination, in other mechanical arrangements where its kinematical features are of value.

The diameter, material, cross-sectional shape, and method of construction of a tendon are all design considerations. An ideal tendon would have infinite longitudinal stiffness, zero thickness, no side bending stiffness, a round cross-section, and be made of only one strand. However, real tendons are always a compromise with these ideals, and thus these characteristics are design issues. For example, as the working load increases, the diameter of the tendon must increase. As the diameter increases, the side bending stiffness increases, and a point is reached where a single strand becomes too stiff and a twisted multi-strand construction is necessary. Thus, the size of the mechanism and its intended application will determine the type of tendon used. High strength wire, such as so-called "music wire" is a good choice for many applications requiring only moderate strength, while multi-strand steel cable is good for many high force applications. Special applications for the mechanism may suggest special tendons. For example, quartz fibers, synthetic material cords or lines (such as Kevlar line), silk strands, carbon fibers, stainless steel bands etc., can be used where their tendon characteristics are satisfactory for a given application.

The tendon material can be chosen to be electrically conductive or to be non-conductive. Conductive tendons can be used to provide electrical power to the moving platform, or to transmit electrical signals, as from sensors or switches, for examples.

The preferred embodiment uses idler pulleys and tendon guides to define a constrained path for the tendons. A constrained path can be defined without using moving parts by providing rigid low-friction surfaces to constrain the tendon while changing the path's direction. This approach is especially useful for small mechanisms.

By adding visual feedback, (by a video camera and linked display, for example), the master/slave mode discussed above can be made a teleoperator mode; the human operator can be removed from the site of the mechanism yet still control the mechanism in real time. For example, the internet can be used as a data link to provide a signal link between the man/machine interface joy stick, for example), and to provide visual feed back to the remotely located operator. If the man/machine interface is a haptic wrist, or equivalent, an internet connection can also provide force feedback to the human operator. With such an arrangement, a skilled surgeon could operate on a patient who is thousands of miles away.

Although the above descriptions contain many specificities, these should not be construed as limiting the scope of the invention but as merely providing illustration of the presently preferred embodiment of this invention.

The scope of usage is very broad, including, but not limited to:

machining parts.

micro machining.

micro assembly.

picking and placing, as for industrial assembly operations.

physical therapy motions.

medical operations for humans and animals.

mini, micro, and macro manipulation.

teleoperator control for dangerous, or remote, operations.

augmenting aids for the handicapped.

master/slave operations such as surgery, sculpting or materials handling.

Accordingly, the scope of the invention should be determined not by the embodiments illustrated, but by the appended claims and their legal equivalents.

I claim:

1. A method for creating a variable-length mechanism link possessing pivoting freedom about an invariable-and-known end point, comprising the steps of:
   a. joining a first link to a second link with a first revolute joint having a first axis of rotation, and
   b. joining a third link to said second link with a second revolute joint having a second axis of rotation, such that said second axis of rotation is orthogonal to, and intersects, said first axis of rotation, and such that said third link's line vector intersects said first axis of rotation and said second axis of rotation at their point of intersection, and
   c. attaching a tendon-length-controlling actuator and a first segment of a constrained tendon path to said first link, such that said first segment proceeds from said actuator to become collinear with said first axis of rotation, and
   d. attaching a second segment of said constrained tendon path to said second link, such that said second segment changes from being collinear with said first axis to become collinear with said second axis of rotation, and
   e. attaching a third segment of said constrained tendon path to said third link, such that said third segment changes from being collinear with said second axis to become collinear with said third link's line vector, and
   f. attaching a tendon to said actuator, and threading said tendon along said first segment and then along said second segment and then along said third segment, for a distance determined by said third link's required length, to terminate with a tensile force load,
   whereby said tendon remains in tension throughout said path.

2. The method for creating a variable-length mechanism link of claim 1 further including the steps of:
   a. combining a means for measuring angular rotation with said first revolute joint, such that an angular position of said second link with respect to said first link about said first axis of rotation can be determined, and b. combining a means for measuring angular rotation with said second revolute joint, such that an angular position of said third link with respect to said second link about said second axis of rotation can be determined.

3. A variable-length mechanism link, possessing pivoting freedom about an invariable-and-known end point, comprising:

a. a first link joined to a second link with a first revolute joint having a first axis of rotation, and b. a third link joined to said second link with a second revolute joint having a second axis of rotation, such that said second axis of rotation is orthogonal to, and intersects, said first axis of rotation, and such that said third link's line vector intersects said first axis of rotation and said second axis of rotation at their point of intersection, and c. a tendon-length-controlling actuator and a first segment of a constrained tendon path, both rigidly affixed to said first link, such that said first segment proceeds from said actuator to become collinear with said first axis of rotation, and d. a second segment of said constrained tendon path rigidly affixed to said second link, such that said second segment changes from being collinear with said first axis to become collinear with said second axis of rotation, and e. a third segment of said constrained tendon path rigidly affixed to said third link, such that said third segment changes from being collinear with said second axis to become collinear with said third link's line vector, and f. a tendon, attached to said actuator, and threaded along said first segment and then along said second segment and then along said third segment, for a distance determined by said third link's required length, to terminate with a tensile force load, whereby said tendon remains in tension throughout said path.

4. The variable-length mechanism link of claim 3 further including:

a. a means for measuring angular rotation in combination with said first revolute joint, such that an angular position of said second link with respect to said first link about said first axis of rotation can be determined, and b. a means for measuring angular rotation in combination with said second revolute joint, such that an angular position of said third link with respect to said second link about said second axis of rotation can be determined.

5. A parallel-leg mechanism, comprising:

a. a base structure, and b. a plurality of tendon legs joined to said base structure by a first means for providing a base leg end for each of said legs, such that said base leg end is known, invariable, and possesses two degrees of rotational freedom, with respect to said base structure, and such that said base leg ends are disposed at predetermined points on a base triangle, and c. a platform joined to each of said legs by a second means for providing a platform leg end for each of said legs, such that said platform leg end is known, invariable, and possesses pivoting freedom, with respect to said platform, and such that said platform leg end is common to two of said legs, and such that the leg ends are disposed to form a triangle that is fixed relative to said platform, and d. a third means for providing tensile force loading in combination with each platform leg end, whereby each of said legs is in tension, and e. associated with each of said legs, a tendon attached to a controllable actuator, such that controlled extension and retraction of said tendon is obtained, and f. said tendon in combination with a fourth means for kinematically constraining the path of said tendon, such that said actuator is able to controllably change the length of said leg between said base leg end and said platform leg end, whereby said platform can be moved and positioned with six degrees of freedom.

6. The parallel-leg mechanism of claim 5 further including: said actuators in combination with a fifth means for computing kinematical solutions for said parallel-leg mechanism and imparting commands to said actuators, such that said legs impart a controlled motion to said platform.

7. The parallel-leg mechanism of claim 6 further including: a human-operator interface in combination with said fifth means, whereby a human operator can direct the motion of said platform in real time operation.

8. The parallel-leg mechanism of claim 7 wherein said human-operator interface is one or a plurality of joy sticks.

9. The parallel-leg mechanism of claim 7 wherein said human-operator interface is a haptic wrist.

10. The parallel-leg mechanism of claim 6 further including: a sixth means for measuring angular rotation in combination with said legs, such that an angular rotation of each of said legs about its said base leg end, with respect to each of said two degrees of rotational freedom can be determined, whereby position feedback can be obtained.

* * * * *